(12) United States Patent
Martin et al.

(10) Patent No.: US 8,202,501 B2
(45) Date of Patent: Jun. 19, 2012

(54) METHOD FOR PREPARING A SYNTHETIC TALC COMPOSITION FROM A KEROLITE COMPOSITION

(75) Inventors: Francois Martin, St Foy d'Aigrefeuille (FR); Jocelyne Ferret, Toulouse (FR); Cedric Lebre, Toulouse (FR); Sabine Petit, Bonneuil Matours (FR); Olivier Grauby, Auriol (FR); Jean-Pierre Bonino, Pechabou (FR); Didier Arseguel, Deyme (FR); Alain Decarreau, Poitiers (FR); Eric Ferrage, Toulouse (FR)

(73) Assignees: Luzenac Europe SAS, Toulouse (FR); Centre National de la Recherche Scientifique (C.N.R.S.), Paris (FR)

( * ) Notice: Subject to any disclaimer, the term of this patent is extended or adjusted under 35 U.S.C. 154(b) by 716 days.

(21) Appl. No.: 12/374,196

(22) PCT Filed: Jul. 13, 2007

(86) PCT No.: PCT/FR2007/001202
§ 371 (c)(1), (2), (4) Date: Jan. 16, 2009

(87) PCT Pub. No.: WO2008/009801
PCT Pub. Date: Jan. 24, 2008

(65) Prior Publication Data
US 2009/0252963 A1 Oct. 8, 2009

(30) Foreign Application Priority Data
Jul. 17, 2006 (FR) ...................................... 06 06476

(51) Int. Cl.
*C01B 33/00* (2006.01)
(52) U.S. Cl. ........................................................ 423/331
(58) Field of Classification Search .................... 423/331
See application file for complete search history.

(56) References Cited

U.S. PATENT DOCUMENTS 7,794,625 B2 * 9/2010 Martin et al. .............. 252/378 R
2001/0042704 A1 * 11/2001 Lacombe et al. ............. 208/210

FOREIGN PATENT DOCUMENTS

DE 101 25 879 11/2002

OTHER PUBLICATIONS

Alain Decarreau et al., "Synthese et stabilite des stevensites kerolites et talcs, magnesiens et nickeliferes, entre 80 et 240C", C.R. Acad. Sci. Paris, vol. 308, No. II, 1989, XP008075903, pp. 301-306.
F. Martin et al., "Experimental study of si-Ge tetrahedral solid solution in Ni-Co-Mg talcs", Thin solid Films, vol. 222, 1992, XP002422974, pp. 189-195.
International Search Report dated Dec. 28, 2007, from corresponding PCT application.

* cited by examiner

*Primary Examiner* — Steven Bos
(74) *Attorney, Agent, or Firm* — Young & Thompson (57) ABSTRACT

The invention relates to a method for preparing a synthetic talc composition. According to said method, a kerolite composition is subjected to an anhydrous thermal treatment carried out at a pressure lower than 5 bar, from over a few hours up to over a few days, at a treatment temperature higher than 300° C. The invention also relates to a synthetic talc composition prepared in this way, the synthetic talc particles of the composition being exclusively of chemical formula —$(Si_4)Mg_3O_{10}(OH)_2$— and identifiable, during X-ray diffraction, by the presence of a characteristic diffraction peak located at a distance of between 9.40-9.68 and corresponding to a plane (001). Said synthetic talc particles also have a thermally stable crystalline structure of stacked laminae, which is very similar to that of a natural talc and has a particle size smaller than approximately ten micrometers.

9 Claims, 5 Drawing Sheets

METHOD FOR PREPARING A SYNTHETIC TALC COMPOSITION FROM A KEROLITE COMPOSITION

The invention relates to a method for preparing a synthetic talc composition comprising thermally stable talc particles having the formula $Si_4Mg_3O_{10}(OH)_2$. Depending on the particular parameters applied during the implementation of the method, the particle size of the synthetic talc particles varies from several tens of nanometers to about ten micrometers, with substantially unimodal and monodisperse distribution.

Natural talc is a mineral, a hydrated magnesium silicate of formula $Si_4Mg_3O_{10}(OH)_2$, which is arranged as a stack of laminae.

Used essentially in the form of fine particles, talc is employed in many industrial sectors: thermoplastics, elastomers, paper, paints, varnishes, textiles, metallurgy, pharmaceuticals, cosmetics, phytosanitary products, fertilizers, etc., where it is incorporated into the compositions either as an inert filler (for chemical stability, for example, to dilute the active substances, expensive materials) or as a functional adjuvant (for example to correct/enhance certain mechanical or electrical properties of various materials), as a lubricant, emollient, hydrophobic agent, etc. Its considerable ability to absorb oils also opens up many perspectives in the development of novel pollution control techniques.

For some of those applications, a high purity, a high lamellarity and a particular fineness of the particles, as well as a narrow particle size and lamellar distribution, are desirable because they can be determinative for the quality of the end product.

However, in order to prepare a pulverulent composition from blocks of natural talc, the conventional techniques of grinding and treating the talc do not allow the above-mentioned criteria to be controlled truly accurately.

There is at present no divided solid composition of natural talc that is 100% pure; not all the particles of that composition have the chemical formula $Si_4Mg_3O_{10}(OH)_2$, which is accordingly only very theoretical. The degree of purity and the nature of the impurities (more or less high contents of Fe, Al, F, and traces of Mn, Ti, Cr, Ni, Ca, Na and/or K) of a natural talc are dependent on the parent deposit.

Likewise, the particle size (fineness and particle size distribution of the pulverulent particles) depends substantially on the mechanical grinding techniques and equipment used. The powders obtained from a natural talc by mechanical grinding generally have a particle size of the order of from several micrometers to several hundred micrometers.

As well as causing a not inconsiderable fluctuation in the particle size distribution of the particles, mechanical grinding results in a gradual and significant structural deterioration of the talc and the appearance of numerous defects in its crystalline structure. The finer the grinding, the greater the resulting alteration in the original crystalline structure.

In this connection there is known NANOTALC®, a pulverulent natural talc composition comprising particles of from 70 to 120 nm, prepared by a particularly intensive mechanical grinding method. Apart from a greatly altered crystalline structure of the mineral, as is the case with any composition prepared from a natural talc, NANOTALC® is not 100% pure.

In addition, the preparation of synthetic talcs has been the subject of theoretical and scientific studies for many years, without as yet yielding satisfactory practical results—especially results which are compatible with the quality and profitability constraints associated with use on an industrial scale.

The publication Decarreau et al., 1989 ("Synthèse et stabilité des stévensites kérolites et talcs, magnésiens et nickeliféres, entre 80 et 240° C."—R. Acad. Scie. Paris—t. 308, series II, p. 301-306) mentions a method which, depending on the applied operating conditions, results in the more or less specific formation of stevensites, kerolites and/or talcs.

That method begins with the formation of an initial coprecipitate obtained by means of a reaction between a sodium metasilicate solution and a magnesium (or nickel) chloride solution. There is then obtained a highly hydrated silicometallic gel which is gelatinous in consistency and has the chemical formula: $Si_4Mg_3O_{11}$,n'$H_2O$ (or $Si_4Ni_3O_{11}$,n'$H_2O$). A series of steps of centrifugation and washing with distilled water allows the silicometallic gel to be freed of the NaCl formed at the end of the coprecipitation reaction.

The silicometallic gel is then subjected to forced drying, which allows the highly hydrated composition of gelatinous texture to be converted into a solid and dehydrated silicometallic composition having the chemical formula $Si_4Mg_3O_{11}$.n$H_2O$, n referring to the few molecules of water forming a particularly stable complex with the solid material, trapped inside the pores of the solid substance (here n<<n'). The solid, dehydrated silicometallic composition is then ground/pulverized to give a fine powder before being subjected to a hydrothermal treatment at saturation water vapour pressure. To that end, the powder is dispersed in distilled water (for example 200 mg of powder to 30 cm$^3$). The mixture is placed in a metal autoclave having an inner lining of polytetrafluoroethylene (Teflon®). The duration of the hydrothermal treatment can be from two weeks to several months, and the treatment temperature can vary from 80° C. to 240° C.

That publication indicates that a hydrothermal treatment carried out for two weeks at temperatures below 100° C. would result in the formation of stevensites. At temperatures of the order of from 110 to 140° C., the treatment would yield kerolites, and at temperatures of the order of from 170 to 240° C., talcs would be obtained.

With regard to the talcs prepared by that method, retromorphosis experiments (carried out especially at 135° C.) enabled the authors of that publication to find a structural instability which manifests itself in a reduction in crystallinity and a shift towards the formation of kerolites.

The hydrothermal synthesis method as described in the publication Decarreau et al., 1989 therefore does not allow a talc composition of satisfactory quality—especially in terms of crystallinity and thermal stability—to be obtained.

An object of the present invention is to propose synthetic talc compositions that have a lamellar and crystalline structure as well as a thermal stability that are highly comparable with those of natural talcs.

The invention aims in particular to propose a novel method for preparing such a synthetic talc composition which is simple and rapid to carry out and which is compatible with the constraints associated with use on an industrial scale. In particular, it aims to improve the synthesis method described by the publication Decarreau et al., 1989, especially by remedying the thermal instability of the crystalline structure of the "talcs" obtained by the method described in that publication.

It is also an object of the invention to propose a method by which it is possible to obtain pulverulent synthetic talc compositions of high purity comprising mineral particles which are very fine and have substantially unimodal and monodisperse size distribution.

To that end, the invention relates to a method for preparing a synthetic talc composition, in which a kerolite composition is subjected to an anhydrous thermal treatment carried out at a pressure lower than 5 bar, for a period of time (especially ranging from several hours to several days) and at a treatment temperature greater than 300° C. The duration and the temperature of the anhydrous thermal treatment are chosen so as to obtain thermally stable synthetic talc particles having the formula $Si_4Mg_3O_{10}(OH)_2$.

The invention is the result of the essential and surprising finding that an anhydrous thermal treatment carried out at a temperature at least greater than 300° C. allows a kerolite composition to be converted in an extremely simple manner into a stable and pure synthetic talc composition having characteristics that are very precisely defined and foreseeable.

Most particularly, the inventors have demonstrated that an anhydrous thermal treatment according to the invention has the effect of inducing a gradual reorganization of the "pseudocrystalline and hydrated" lamellar structure of a kerolite by reducing the voids in the crystal lattice, and the release of the molecules of water trapped in the interfoliar spaces.

An anhydrous thermal treatment carried out at 300° C. effectively allows notable modifications to the structure of the kerolites to be induced (which modifications are detectable especially by methods of infrared and X-ray diffraction analysis), capable of yielding a synthetic talc.

Advantageously and according to the invention, the anhydrous thermal treatment is therefore carried out at a temperature of the order of from 500 to 550° C. At such a temperature, a synthetic talc is obtained in about 5 hours. Advantageously and according to the invention, in order to obtain thermally stable synthetic talc particles, the treatment time is greater than 5 hours.

Advantageously and according to the invention, the anhydrous thermal treatment is carried out in ambient air, inside a crucible, for example made of ceramics or of any other material suitable for the treatment temperature.

Directly following an anhydrous thermal treatment according to the invention there is obtained a solid, crude substance which is white in color and corresponds to more or less coarse aggregates formed of mutually aggregated elementary synthetic talc particles. Advantageously and according to the invention, at the end of the anhydrous thermal treatment, mechanical grinding is provided in order to loosen the aggregates into individualized elementary talc particles and thus obtain a pulverulent composition. The size distribution of the elementary particles is substantially unimodal and monodisperse.

According to a preferred embodiment, advantageously and according to the invention there is used a kerolite composition that has previously been prepared from a silicometallic gel of the chemical formula $Si_4Mg_3O_{11}$,n'$H_2O$ by means of an appropriate hydrothermal treatment.

In this case, a method according to the invention also and advantageously comprises a preliminary step in which a kerolite composition is prepared, which composition will subsequently be subjected to an anhydrous thermal treatment as described above.

Advantageously and according to the invention, said kerolite composition is prepared from a silicometallic gel of the formula $Si_4Mg_3O_{11}$,n'$H_2O$, which has been subjected to a hydrothermal treatment at saturation water vapour pressure and at a temperature of from 100° C. to 240° C. for a period of from one day to several months.

The choice of parameters, especially the temperature and duration, of said hydrothermal treatment permits a certain degree of control of the particle size of the synthetic talc particles that will ultimately be obtained. Depending on the chosen parameters, the synthetic talc particles which will ultimately be obtained will have a particle size ranging from several tens of nanometers to about ten micrometers, with a substantially unimodal and monodisperse particle size distribution.

Advantageously and according to the invention, the silicometallic gel is prepared by coprecipitation according to the reaction:

m, n' and (m−n'+1) being positive integers.

Advantageously and according to the invention, the kerolite composition obtained directly from the hydrothermal treatment of said silicometallic gel is dried and then ground in order to obtain a pulverulent composition before it is subjected to said anhydrous thermal treatment. To that end, drying can be carried out by means of an oven; for example at a temperature of the order of 60° C., for at least one to two days. Grinding is advantageously carried out mechanically; for example using a mortar, preferably made of agate in order to avoid any risk of contamination of the kerolite composition.

In a manner very comparable with natural talc particles, the synthetic talc particles of a composition according to the invention have a microscopic organization in the form of superposed laminae; each lamina has a crystalline structure composed of a layer of octahedrons (occupied by the $Mg^{2+}$ cations) intercalated between two layers of inverse tetrahedrons (occupied by the $Si^{4+}$ cations). The structural similarities that exist between a synthetic talc obtained according to the invention and a natural talc have been demonstrated by X-ray diffraction analysis methods and by infrared absorption.

It will be noted, however, that, unlike a natural talc composition, the particles in a synthetic talc composition according to the invention are exclusively talc particles corresponding to the chemical formula $Si_4Mg_3O_{10}(OH)_2$. There is at present no pulverulent composition prepared from natural talc that is 100% pure.

In addition, when analyzed by X-ray diffraction, for example, the difference between a synthetic talc of a composition according to the invention and a natural talc appears substantially in the position of the diffraction peak corresponding to the plane (001). For a synthetic talc according to the invention, that diffraction peak is at a distance of between 9.40 Å and 9.68 Å—instead of 9.35 Å for natural talc.

Advantageously, a synthetic talc composition according to the invention is distinguished in that an X-ray diffraction analysis of the particles of talc yields a diffractogram having the following characteristic diffraction peaks:

- a peak located at 9.40-9.68 Å, corresponding to a plane (001);
- a peak located at 4.50-4.60 Å, corresponding to a plane (020);
- a peak located at 3.10-3.20 Å, corresponding to a plane (003);
- a peak located at 1.50-1.55 Å, corresponding to a plane (060).

Advantageously and according to the invention, the diffraction peak corresponding to the plane (001) is located at a distance of the order of 9.40-9.43 Å.

Likewise, in a synthetic talc composition according to the invention, the synthetic mineral particles exhibit a crystallinity of good quality together with an extremely fine particle size, from several tens of nanometers to about ten micrometers. In fact, with the current state of grinding techniques, particles having such a fineness can be obtained from a natural talc only with severe "amorphization" (reduction in crystallinity) of the product. In X-ray diffraction, such amorphization manifests itself especially in a reduction in the intensity of the characteristic diffraction peaks, which are especially the peaks located at: 9.35 Å for the plane (001), 4.55 Å for the plane (020), 3.14 Å for the plane (003) and 1.52 Å for the plane (060).

A synthetic talc composition according to the invention can be in a "crude" form, comprising synthetic talc particles which are combined with one another to form aggregates. Such a synthetic talc composition can especially be obtained directly from an anhydrous thermal treatment according to the invention, before it is subjected to a grinding sequence.

A synthetic talc composition according to the invention can likewise and advantageously be in the form of a pulverulent and dehydrated composition of individualized synthetic talc particles. In view of the pulverulent nature of such particles, owing to their small particle size (from several tens of nanometers to about ten micrometers), they are then advantageously brought into solution for the purposes of preservation, until they are used. Within this context, in a synthetic talc composition according to the invention the talc particles are present in individualized form dispersed in a liquid.

Advantageously, in a composition according to the invention the talc particles have a particle size of less than 500 nm, especially from 20 nm to 100 nm.

Advantageously, in a composition according to the invention the talc particles have a substantially unimodal and monodisperse particle size distribution.

The invention relates also to a method for preparing a synthetic talc composition and to a talc composition, characterized in combination by all or some of the features mentioned hereinabove or hereinbelow.

Other objects, advantages and features of the invention will become apparent from reading the description and the examples which follow and which refer to the accompanying figures, in which:

A/—PROTOCOL FOR SYNTHESIS OF A SYNTHETIC TALC COMPOSITION

According to the invention, the preparation of a synthetic talc composition comprises the anhydrous thermal treatment of a kerolite composition. The anhydrous thermal treatment is carried out at low pressure, less than 5 bar (for example at atmospheric pressure) and at a temperature greater than 300° C.

Although the invention focuses substantially on this anhydrous thermal treatment, there will also be described hereinbelow a preferred method for preparing a silicometallic gel as well as a preferred method for treating that gel in order to obtain said kerolite composition. An anhydrous thermal treatment according to the invention allows a kerolite to be converted into a perfectly crystallized and thermally stable talc. The particle size of the talc can be determined and adjusted in dependence on the characteristics of the starting kerolite and on the process used to prepare that kerolite.

1/—Preparation of the Silicometallic Gel

The silicometallic gel is prepared by a coprecipitation reaction according to the following equation:

$$4(Na_2OSiO_2, 5H_2O) + 3(MgCl_2, 6H_2O) + 2HCl \longrightarrow (Si_4Mg_3O_{11}, n'H_2O) + 8NaCl + (39-n')H_2O$$

The coprecipitation reaction allows a hydrated silicometallic gel having the stoichiometry of talc (4 Si to 3 Mg) to be obtained. It is carried out starting from:

1. an aqueous solution of penta-hydrated sodium metasilicate, prepared by diluting 0.1 mole of sodium metasilicate in 250 cm$^{-3}$ of distilled water,
2. a solution of magnesium chloride, prepared by diluting 0.075 mole of magnesium chloride (in the form of hygroscopic crystals) in 50 cm$^{-3}$ of distilled water, and
3. 50 cm$^{-3}$ of 1N hydrochloric acid.

The silicometallic gel is prepared according to the following protocol:

1. the solutions of hydrochloric acid and of magnesium chloride are mixed,
2. the mixture is added to the solution of sodium metasilicate; the coprecipitation gel forms instantly,
3. after centrifugation (7000 revolutions per minute for 15 minutes) and removal of the supernatant (sodium chloride solution that has formed), a gel is recovered,
4. the gel is washed with water, for example with distilled water, osmozed water or simply with tap water (a minimum of two washing/centrifugation cycles).

At the end of this first phase, a highly hydrated, white silicometallic gel $Si_4Mg_3O_{11}$,n'H$_2$O is obtained. Its consistency is gelatinous.

2/—Treatment of the Silicometallic Gel to Yield a Kerolite Composition

Before the silicometallic gel is subjected to a hydrothermal treatment to give a kerolite composition within the scope of the invention, the gel, which is of gelatinous texture, is dried for two days in an oven at 60° C. This relatively long drying time is explained by the considerable hydration of the gel collected after centrifugation.

The resulting silicometallic aggregates are ground with an agate mortar until a homogeneous powder is obtained.

The pulverulent silicometallic composition is then subjected to a hydrothermal treatment to give a kerolite composition. To this end:
1. the pulverulent silicometallic composition is placed in a reactor (autoclave) with distilled water in a liquid/solid ratio of 0.83 (for example 200 g of pulverulent composition to 166 cm$^3$ of water),
2. the reactor is placed in an oven at a temperature of the order of 220° C. and for a treatment time of one day or more,
3. when the hydrothermal treatment is complete, the solid material of the reaction medium is filtered off and then dried.

There is ultimately obtained a solid, white, divided composition corresponding to a kerolite composition within the scope of the invention.

3/—Anhydrous Thermal Treatment of the Kerolite Composition

The kerolite composition previously prepared is then subjected to an anhydrous thermal treatment. To this end, it is placed in a platinum crucible and then heated. It is also possible to use a crucible made of ceramics or of any other material suitable for the treatment temperature. Heating of said composition is carried out at atmospheric pressure.

B/—STRUCTURAL ANALYSIS AND CHARACTERIZATION OF THE RESULTING PRODUCTS

The lamellar and crystalline structures of the kerolite particles and of the talc particles obtained during and at the end of the implementation of the method defined above were characterized by transmission and diffuse reflection infrared spectroscopy and by X-ray diffraction. The collected data are presented in FIGS. 1, 2a, 2b, 3, 4 and 5 and are discussed hereinbelow.

1/—Infrared Analysis

It is known that the characteristic vibration bands of natural talc, in infrared, are as follows (with a resolution of 4 cm$^{-1}$):
  3678 cm$^{-1}$: Mg$_3$—OH bond vibration;
  1018 cm$^{-1}$: Si—O—Si bond vibration;
  669 cm$^{-1}$: Mg—O—Si bond vibration;
  7185 cm$^{-1}$: 2vMg$_3$—OH bond vibration.

Figure 1:
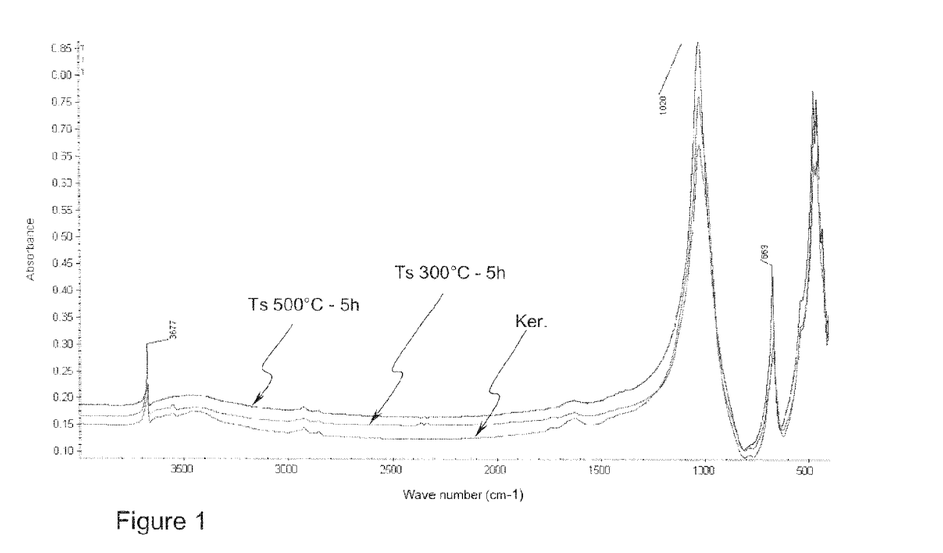
FIG. 1 shows three absorption spectra recorded in the mid-infrared range and corresponding to three particular synthetic mineral compositions according to the invention, FIGS. 2a and 2b correspond to enlargements of the spectra of FIG. 1, in the region of particular zones.

FIG. 1 shows the results of analyses carried out in the mid-infrared range on:
  a kerolite composition (Ker.) prepared according to the method described above,
  a first synthetic talc composition (Ts 300° C.—5 h) obtained from the above kerolite composition and with an anhydrous thermal treatment at 300° C. for 5 hours,
  a second synthetic talc composition (Ts 500° C.—5 h) obtained from the above kerolite composition and with an anhydrous thermal treatment at 500° C. for 5 hours.

The infrared spectra were recorded using a Nicolet 510-FTIR spectrometer over a range of 4000 to 400 cm$^{-1}$.

Figure 2A:
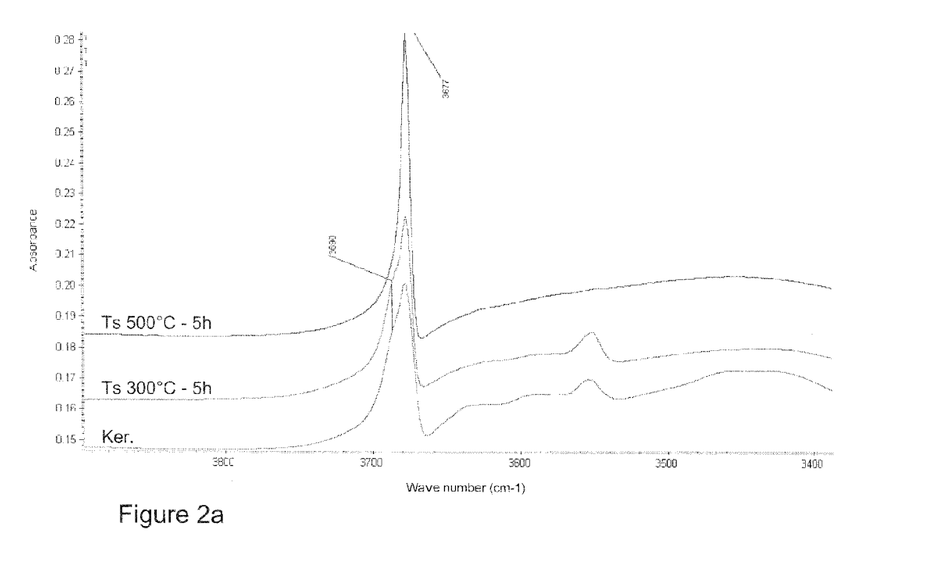
Figure 2B:
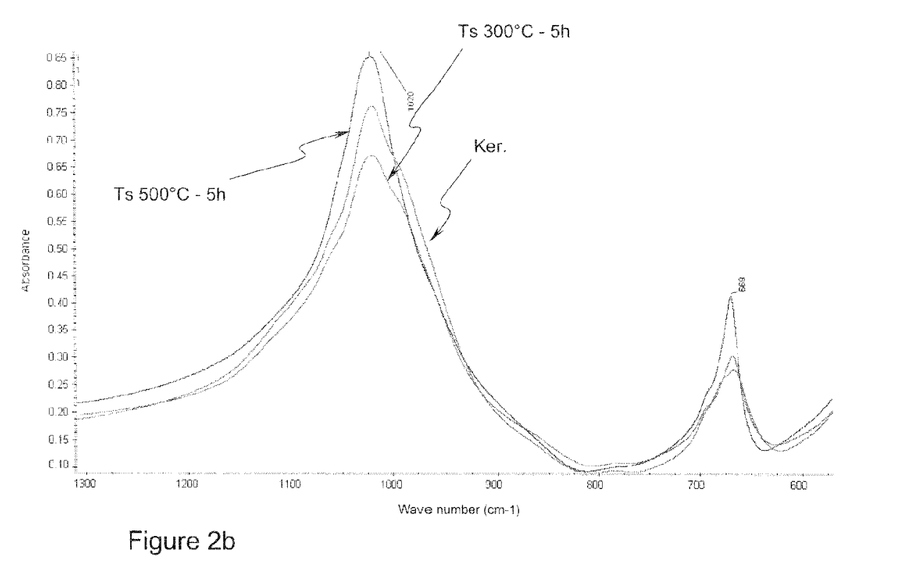

In addition, FIGS. 2a and 2b show enlargements of the zones in which the vibration bands at 3678 cm$^{-1}$, 1018 cm$^{-1}$ and 669 cm$^{-1}$ are located.

Figure 3:
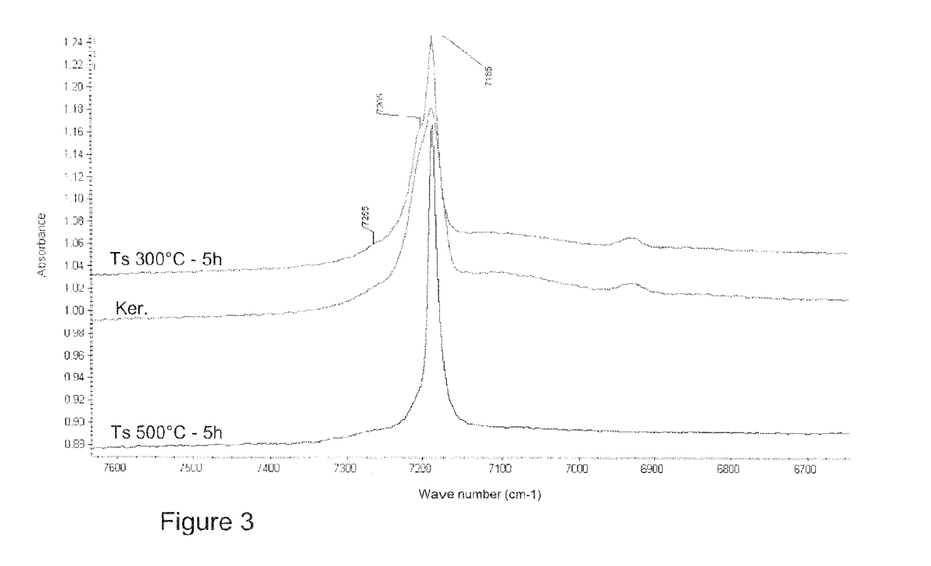
FIG. 3 shows three absorption spectra recorded in the near-infrared range and corresponding to the three synthetic mineral compositions described above.

Measurements were also carried out in diffuse reflection in the near-infrared range in order to show the Mg$_3$—OH bond vibration pointed at 7185 cm$^{-1}$. FIG. 3 shows an enlargement of the zone contained between 6000 cm$^{-1}$ and 8000 cm$^{-1}$.

These results show that an anhydrous thermal treatment can permit the conversion of a synthetic kerolite composition into a synthetic talc composition. This conversion manifests itself especially in the appearance of the four characteristic vibration bands of talc, the fineness of which substantially reflects the crystallinity of the mineral.

The inventors have also found that the fineness of those four bands, and therefore the crystallinity of the treated mineral, increases gradually during the anhydrous thermal treatment and with the duration of that treatment (not all the results are shown in the figures).

It should nevertheless be noted that the enlargement of the zone contained between 6000 cm$^{-1}$ and 8000 cm$^{-1}$ (FIG. 3) reveals a peak at 7265 cm$^{-1}$, close to the reference peak at 7185 cm$^{-1}$. The presence of this bond reflects slight hydration of the resulting product. Molecules of water are intercalated between the laminae of the talc.

The preceding analyses confirm that an anhydrous thermal treatment, especially at 300° C. or at 500° C., allows a kerolite composition to be converted into a talc composition. Nevertheless, with an anhydrous thermal treatment carried out at a temperature of the order of only 300° C., a long time is required to obtain a degree of hydration similar to that of a natural talc.

With an anhydrous thermal treatment at a temperature of the order of 500° C., on the other hand, the treated mineral composition acquires a crystallinity and a degree of hydration that are very comparable with those of a natural talc in a relatively short time (after about 5 hours' treatment).

2/—X-Ray Diffraction Analyses

In X-ray diffraction, natural talc is known to exhibit four characteristic diffraction peaks:
  for the plane (001), a peak located at a distance of 9.35 Å;
  for the plane (020), a peak located at 4.55 Å;
  for the plane (003), a peak located at 3.14 Å;
  for the plane (060), a peak located at 1.52 Å.

Figure 4:
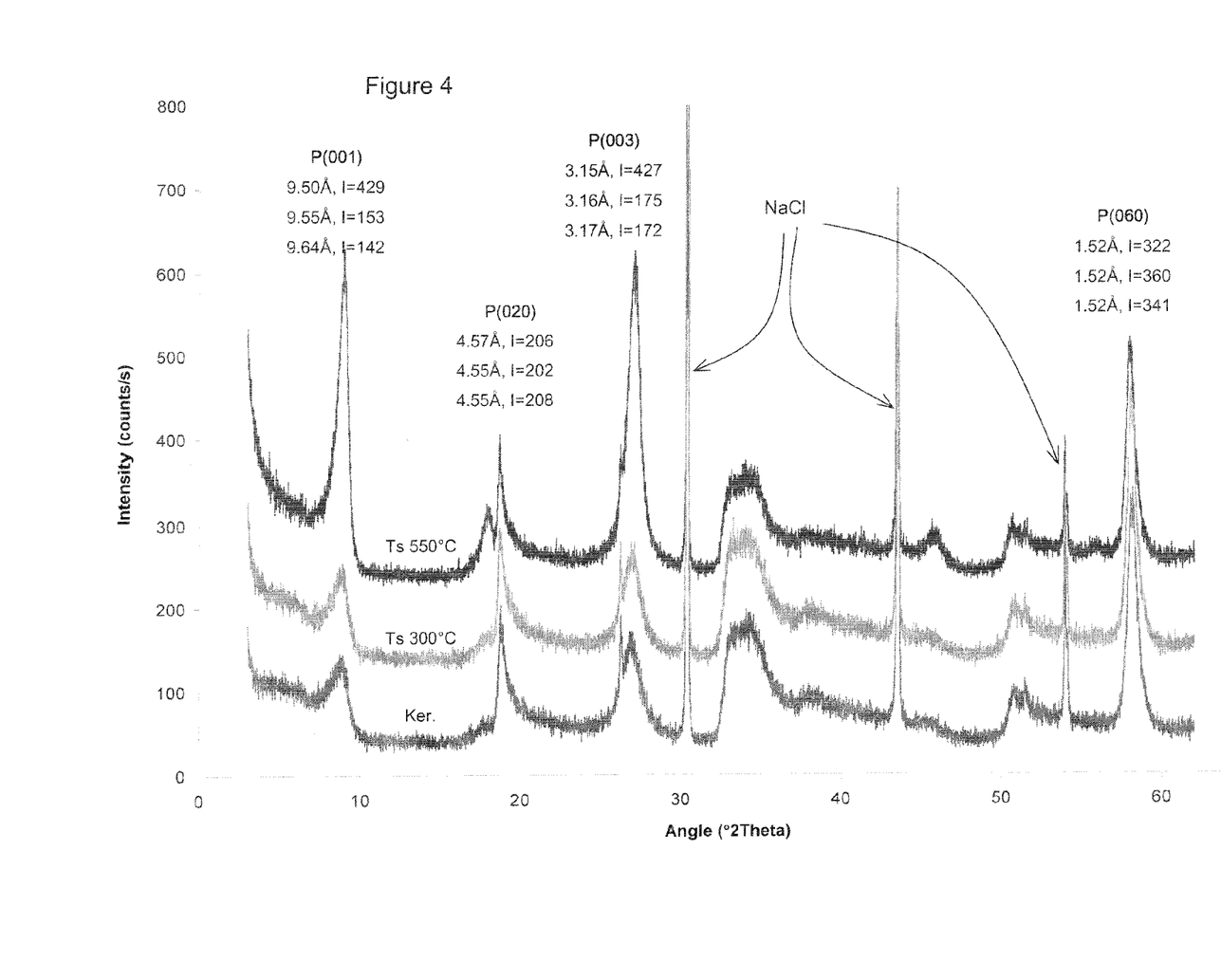
FIG. 4 shows the diffractograms corresponding to the X-ray diffraction analysis carried out on three other particular synthetic mineral compositions according to the invention.

FIG. 4 shows the results of analyses carried out on:
  a kerolite composition (Ker.) prepared according to the coprecipitation method described above,
  a first synthetic talc composition (Ts 300° C.) obtained from the above kerolite composition and with an anhydrous thermal treatment at 300° C. for 5 hours,
  a second synthetic talc composition (Ts 550° C.) obtained from the above kerolite composition and with an anhydrous thermal treatment at 550° C. for hours.

The diffractograms presented in FIG. 4 were recorded using an XPERT-MPD PanAnalytical device.

The 2θ measurement step is 0.010 with an accumulation time of 2 sec/step. The acceleration voltage is 40 kV, the intensity 55 mA. The Bragg equation giving the structural equidistance is: $d_{hkl}=0.7703/\sin\theta$.

These analyses confirm the observations made by infrared spectroscopy.

The characteristic peaks of the talc intensify with an anhydrous thermal treatment both at 550° C. and at 300° C., and that intensity increases with the treatment time.

After only 5 hours of anhydrous thermal treatment at 550° C., the characteristic diffraction peaks of the talc become sharper. In particular, the diffraction peak corresponding to the plane (001) passes from a position at 9.64 Å to 9.50 Å; this is very close to the value of 9.35 Å characteristic of a natural talc. This difference in values reflects a very slight residual hydration of the synthetic talc and/or a very small particle size (nanometric size). However, it must be noted that the hydration becomes less pronounced as the anhydrous thermal treatment time increases.

Measurement of the full width at half maximum of the peaks of the planes (001), (020), (003) and (060) shows the evolution of the crystallinity and confirms that, for a treatment temperature greater than 300° C., the longer the synthesis time, the greater the improvement in the crystallinity of the talc (the full width at half maximum diminishes with the treatment time).

The diffractograms presented in FIG. 4 also reveal the presence of the characteristic diffraction peaks of sodium chloride (NaCl). The presence of these peaks is evidence of insufficient washing and rinsing of the silicometallic gel prior to the hydrothermal treatment. In the present case, the three compositions analyzed were prepared with only one cycle of washing of the silicometallic gel.

Figure 5:
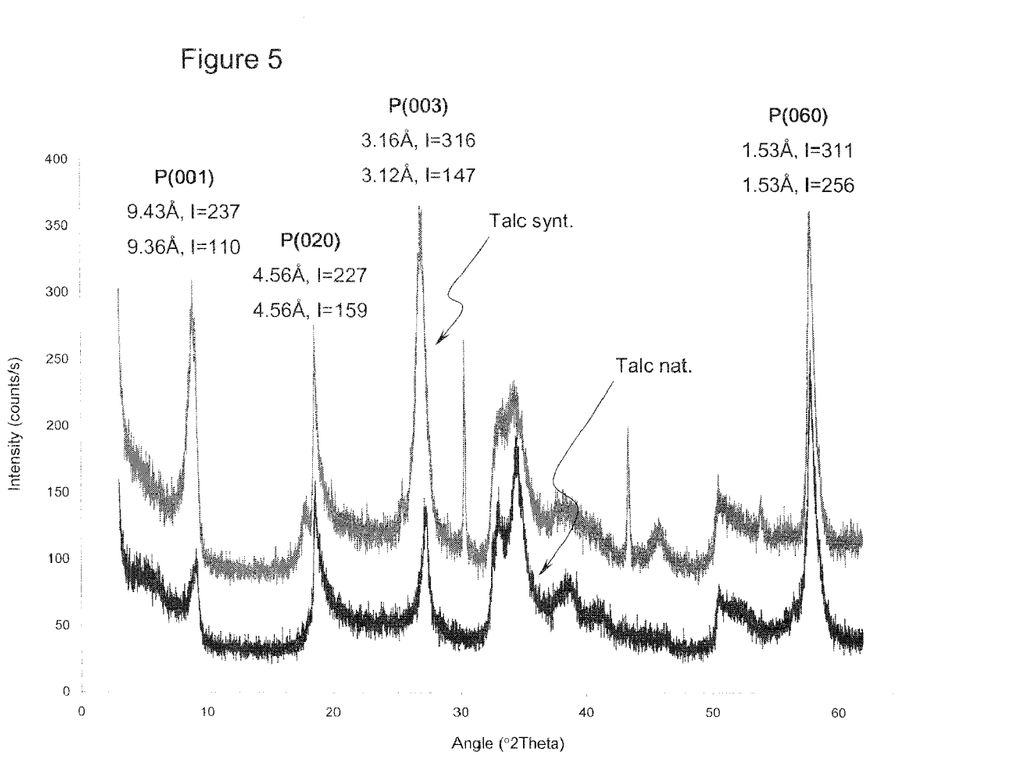
FIG. 5 shows the comparative diffractograms of a synthetic talc composition of nanometric size, prepared according to the invention, and a sample of natural talc, also of nanometric size but obtained by intensive mechanical grinding.

For the purpose of comparison, FIG. 5 presents an RX diffractogram of a sample of synthetic talc (Talc synth.) according to the invention, the talc particles of which are of nanometric size, from 20 to 100 nm, and of a sample of natural talc (Talc nat.) of the prior art, which has been ground mechanically to give particles having a particle size of the order of from 70 to 120 nm.

A first difference between the natural talc and the synthetic talc appears in the position of the diffraction peaks corresponding to the planes (001) and (003):

for the plane (001): 9.43 Å for the synthetic talc instead of 9.36 Å for the natural talc;
for the plane (003): 3.16 Å for the synthetic talc instead of 3.12 Å for the natural talc.

The nanometric natural talc (Talc nat.) also differs from the synthetic talc (Talc syn.) in that the intensity of the diffraction peaks is much weaker.

In addition, as compared with the synthetic talc of nanometric size prepared according to the invention, the natural nanometric talc exhibits diffraction peaks with larger full widths at half maximum (for the same preparation and an identical counting time). These data reflect the better crystallinity of the nanometric synthetic talc prepared according to the invention. Intensive grinding of a natural talc to give a talc of nanometric size leads to considerable amorphization of the product.

C/—THEORETICAL STRUCTURE OF THE SYNTHETIC KEROLITE PARTICLES OBTAINED ACCORDING TO THE INVENTION

Figure 6:
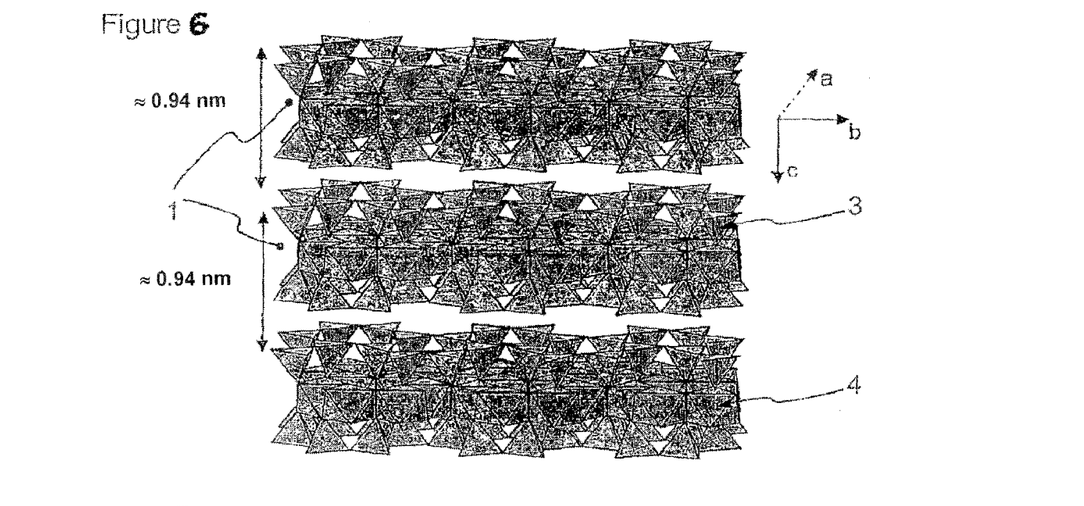
FIGS. 6 and 7 are diagrammatic representations which show, respectively, the crystalline organization of synthetic talc particles obtained from a kerolite composition, after conversion by an anhydrous thermal treatment according to the invention, and the crystalline organization of kerolite particles prepared by a coprecipitation reaction according to the invention.
Figure 7:
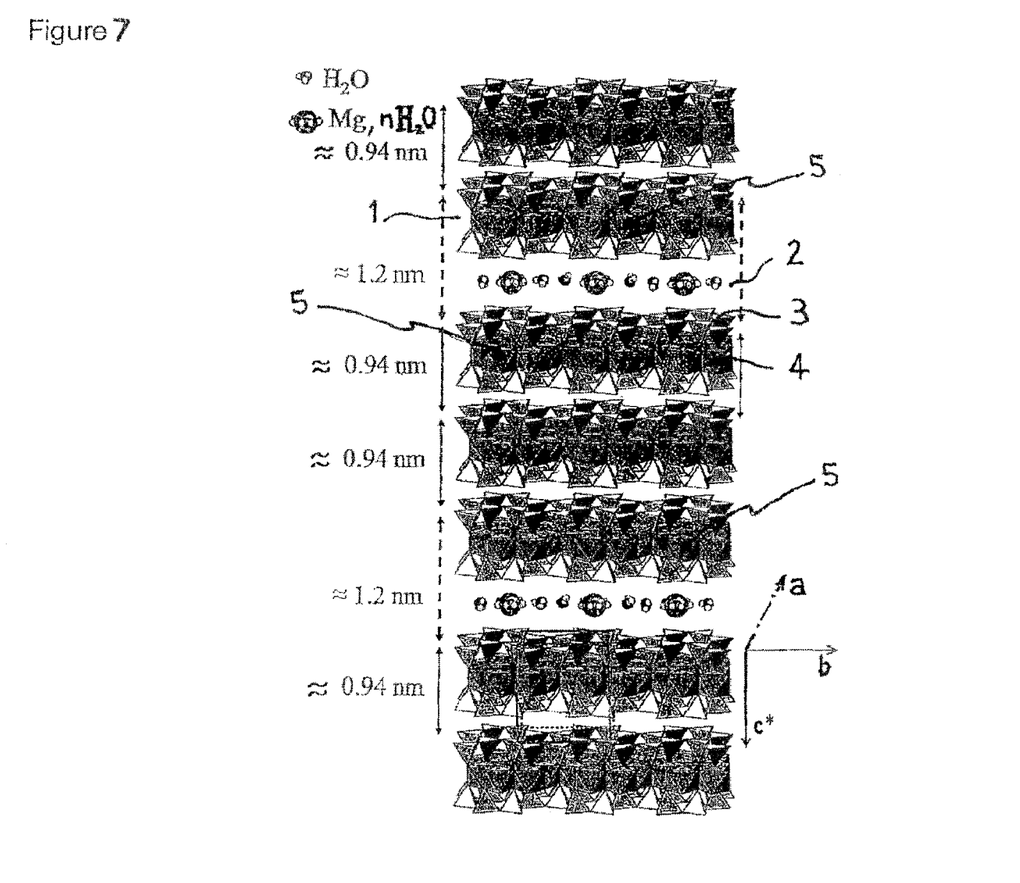

With reference to FIGS. 6 and 7, which show the stratified and crystalline structures in diagrammatic form, talc and kerolite have a microscopic organization in the form of superposed elementary laminae 1, the number of which varies from several units to several tens of units.

For both talc and kerolite, the crystalline structure of the elementary laminae 1 is constituted by the association of two tetrahedral layers located on either side of an octahedral layer.

The octahedral layer is formed by two planes of $O^{2-}$ and $OH^-$ ions (in the molar ratio $O^{2-}/OH^-$ of 2:1). On either side of this median layer there are arranged three-dimensional networks of tetrahedrons 3, one of the vertices of which is occupied by an oxygen common to the tetrahedral layer and to the octahedral layer, while the other three are occupied by substantially coplanar oxygens belonging to a tetrahedral layer.

In the case shown, which relates to synthetic talcs and kerolites prepared according to the invention, the tetrahedral cavities are occupied by $Si^{4+}$ ions and the octahedral cavities by $Mg^{2+}$ cations.

Unlike talc, the crystal lattice of a kerolite has voids 5; a small proportion of the octahedral sites is unoccupied. This results in a cation deficit. The cation deficit is in large part filled by the presence of cations, called compensatory cations, which occupy the interfoliar spaces 2. The interfoliar spaces 2, which are highly hydrated, also constitute a distinctive feature of the crystalline structure of kerolites as compared with that of pure talcs.

The voids 5 explain the low degree of crystallinity observed especially on the RX diffractograms.

The anhydrous thermal treatment tests on the synthetic kerolite compositions according to the invention have shown that the compositions are converted into synthetic talc compositions. In particular, a gradual sharpening of the characteristic diffraction peaks in the region of the planes (001), (020), (003) and (060) is observed, which reflects an improvement in the crystallinity of the laminae 1. Gradually, the voids 5 are filled with the cations of the interfoliar spaces 2. And, concomitantly, the interfoliar spaces become smaller (passing from 12 Å to values of the order of 9.4-9.6 Å); in the plane (001), the characteristic diffraction peak is close to the distance 9.35 Å, which is characteristic of a natural talc.

The invention claimed is:

1. A method for preparing a synthetic talc composition, comprising:
    subjecting a kerolite composition to an anhydrous thermal treatment carried out at a pressure below 5 bar, at a temperature greater than 300° C., and for a period of time to obtain thermally stable synthetic talc particles of the formula $Si_4Mg_3O_{10}(OH)_2$.

2. The method as claimed in claim 1, wherein said anhydrous thermal treatment is carried out at a temperature in a range of from 500° C. to 550° C.

3. The method as claimed in claim 2, wherein the period of time is greater than 5 hours.

4. The method as claimed in claim 1, wherein said anhydrous thermal treatment is carried out in ambient air, inside a crucible.

5. The method as claimed in claim 1, further comprising mechanically grinding said synthetic talc composition to obtain a pulverulent composition.

6. The method as claimed in claim 1, wherein said kerolite composition is prepared from a silicometallic gel of the formula $Si_4Mg_3O_{11}$,n'$H_2O$, which is subjected to a hydrothermal treatment at saturation water vapour pressure and at a temperature of from 100° C. to 240° C., for a period of from one day to several months.

7. The method as claimed in claim 6, wherein said kerolite composition is subjected to the anhydrous thermal treatment after the kerolite composition has been dried and ground to obtain a pulverulent composition.

8. The method as claimed in claim 6, wherein said silicometallic gel is prepared by coprecipitation according to the reaction:

wherein, m, n' and (m−n'+1) are positive integers.

9. The method as claimed in claim 7, wherein said silicometallic gel is prepared by coprecipitation according to the reaction:

wherein, m, n' and (m−n'+1) are positive integers.

* * * * *